United States Patent [19]
Marquis et al.

[11] Patent Number: 4,980,212
[45] Date of Patent: Dec. 25, 1990

[54] SELF-HOLDING DRAFTING PAPER

[76] Inventors: Philip H. Marquis, 806 SE. 53rd Ave., Portland, Oreg. 97215; David Goodman-Farley, 2866 Warwick St., West Linn, Oreg. 97068

[21] Appl. No.: 358,123

[22] Filed: May 26, 1989

[51] Int. Cl.[5] .......................... B32B 7/06; B32B 7/12

[52] U.S. Cl. .......................... 428/40; 428/43; 428/194; 428/906; 281/15.1; 282/22 R; 283/63.1

[58] Field of Search .................. 428/43, 194, 40, 906; 281/15.1; 282/22 R; 283/63.1

[56] References Cited

FOREIGN PATENT DOCUMENTS 8504602 10/1985 World Int. Prop. O. .......... 428/194

*Primary Examiner*—Alexander S. Thomas
*Attorney, Agent, or Firm*—Chernoff, Vilhauer, McClung & Stenzel

[57] ABSTRACT

Substantially transparent drafting paper including a marginal portion of which an area is coated on one face of the paper with an adhesive material securely attached to the marginal portion, but presenting an adhesive surface which is easily removable from a first surface and subsequently reusable for attaching the sheet of drafting paper to another surface. The drafting paper may thus be attached in one location while a portion of a drawing is made on its surface. Thereafter the drafting paper may be removed and adhesively reattached in another location to permit additional matter to be traced from other sources or from other locations. The drafting paper is prevented from movement relative to the underlying surface without need for the use of tacks, tape, weights, or clamps. A parting line, such as a line of perforations, is preferably provided to allow the marginal portion bearing the adhesive coating to be removed from the remainder of the sheet.

13 Claims, 1 Drawing Sheet

SELF-HOLDING DRAFTING PAPER

BACKGROUND OF THE INVENTION

The present invention relates to drafting paper, and particularly to tracing paper which holds itself in place during use without the need for tacks or adhesive tape.

In order to prepare revisions or alternative versions of engineering drawings, architectural sketches, and other drawings, substantially transparent tracing paper is often used to cover an original drawing. Similarly, tracing paper is used frequently in space planning, industrial design, and generally in art and graphics. The purpose of using such tracing paper is to be able to see through the tracing paper to an original or background work, and to be able to prepare new drawings upon the transparent tracing paper sheet without disturbing the background material. Tracing paper is also used frequently to cover navigational charts while piloting in restricted waters, in order to prevent damage to charts which must be reused. In the past, such transparent tracing paper has been fastened in place using various types of adhesive tape, by using tacks or push pins, or by the use of weights to hold the tracing paper in position atop the original works.

None of the previous methods for holding tracing paper in place have been entirely satisfactory. For example, either tacks or adhesive tape can damage the original material. Tack-holes may be left, or a portion of the original material may be removed from its surface by removal of an adhesive tape, or a residue of the adhesive material may be left on the original material, where it eventually will collect dirt which damages the surface of the original material. Residual adhesive material from adhesive tapes also is likely to cling to drawing instruments, causing them to attract damaging contamination.

Weights cannot be relied upon to hold tracing paper firmly in place over the background drawing or graphic materials.

Repositioning of tracing paper originally held in position by use of tacks or adhesive tape involves laboriously removing pieces of adhesive tape from the original or background drawings or graphics materials, or removing tacks, and reapplying the adhesive tape or replacing tacks after the tracing paper has been repositioned.

The previously used adhesive tape, tacks or weights present physical obstacles to the precise use of drafting, engineering, and graphic arts tools such as templates, straight-edges, triangles, scales, drafting machines, and writing or drawing instruments. Adhesive tape, when reused, tends to lose its ability to hold materials securely, yet increasingly becomes an obstacle to the use of drafting tools and writing instruments and tends to accumulate such things such as crumbs of eraser material.

What is needed, then, is an improved manner of attachment of drafting paper or the like safely to original drawings or other graphic materials to be traced, which will hold the tracing paper securely enough in place, either initially, or after repositioning, without interfering with the use of drafting tools and writing instruments, and without collecting dirt or damaging the surface of material to which the drafting or tracing paper is attached.

SUMMARY OF THE PRESENT INVENTION

The present invention overcomes the shortcomings of the previously available methods and apparatus for holding drafting or tracing paper in place on material to be traced or revised, by providing a self-adhesive sheet of tracing material. A portion, such as a marginal portion or portions, of the sheet of tracing paper is provided with a coating of an adhesive material which is reusable to fasten the tracing paper in place more than once, yet which neither leaves a residue of adhesive material nor tears away any of the surface of paper or the like to which it adheres. In a preferred embodiment of the invention, such an adhesive coating is provided in a marginal portion of the sheet of tracing paper and a line of perforations or the like is provided to permit removal of the marginal portion of the sheet of paper from the remainder of the sheet of paper so that the remainder of the sheet of paper can be photocopied without jamming the feed mechanisms of a photocopier.

Sheets of tracing paper according to the present invention may be provided conveniently in blocks or pads of several sheets removably interconnected along an edge of the sheet, or an elongate sheet may be provided in the form of a roll having a coating of adhesive material on removable portions.

It is therefore a principal object of the present invention to provide improved tracing paper which holds itself securely in place during use and can be repositioned one or more times, holding itself securely in position after each repositioning.

It is another important object of the present invention to provide tracing paper which can be attached, for example, to a paper on which background or original drawings or graphic materials are located, without damage to the paper when the tracing paper of the invention is removed.

It a further object of the present invention to provide a self-holding tracing paper which permits photocopying of drawings made thereon without fouling the feed rollers of a photocopier.

It is a principal feature of the present invention that it provides self-holding tracing paper on which a coating of a reusable adhesive, with a low enough adhesiveness to permit the tracing paper to be removed from adhesive connection to an underlying sheet of paper, is provided within a marginal area on one face or side of the tracing paper.

It is an important feature of a preferred embodiment of the present invention that a marginal portion of a sheet of tracing paper includes an area coated with such a reusable adhesive on one face thereof, and the marginal portion is easily detachable from the remainder of the sheet in order to permit the remainder of the sheet to be handled conveniently thereafter, without adhering to surrounding papers or equipment.

A further feature of the present invention is that it includes a coating of a removable, reusable adhesive material in a marginal portion of the sheet, with the coating of adhesive being thin enough that it does not cause any obstruction to the use of drafting tools and writing instruments.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 1:
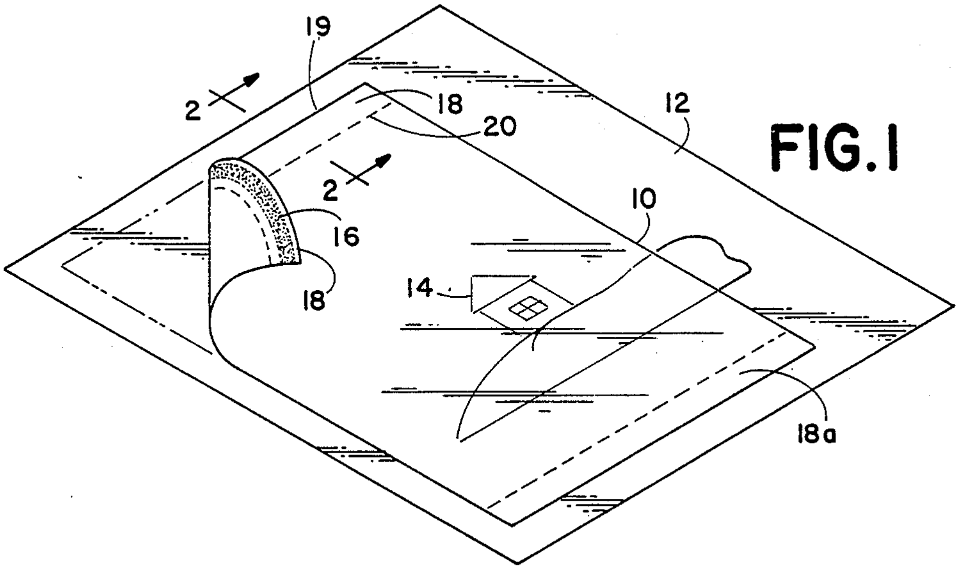
FIG. 1 is a perspective view of a sheet of tracing paper according to the present invention.

Referring to FIG. 1 of the drawings, a sheet 10 of tracing paper according to the present invention is in place atop a sheet of drawing paper 12 from which a drawing is being traced. The term "tracing paper," as it is used here, is intended broadly to mean those different types of paper, vellum, onion skin, and the like, which are translucent or transparent enough to permit their convenient use in preparing tracings from the drawing beneath at least one layer of such tracing paper, and it is not intended to be limited to any specific type of paper as tracing paper.

The sheet of tracing paper 10 is held in place atop the paper 12 by a coating of a reusable adhesive 16 located within a marginal portion 18 of the sheet 10. Preferably, the marginal portion 18 is defined by a parting line, such as a line of perforations 20, so that the marginal portion 18 can be removed easily from the remainder of the sheet 10. Optionally, a marginal portion 18*a* may also be provided at the opposite edge of the sheet 10 and may also be provided with a coating of adhesive 16 (not shown).

The perforations 20 may be of various dimensions, their size not being critical to the invention. Such perforations can be produced with holes having a wide range of sizes and spacings determined according to the appearance desired in the final product and the quality of the tracing paper. A laser-cut perforated line can be made at least as fine as 65 perforations per linear inch, and perforations in coarser gauges, such as 10 perforations per inch, may be manufactured by mechanical punching. The line of perforations 20 allows detachment of the marginal portion 18 with its included areas of adhesive coating 16 so that the remainder of the sheet of tracing paper may be fed through the sheet feed mechanisms of typical photocopying and graphic reproduction machinery without adhering to rollers or other mechanisms of such machinery. Removal of the marginal portion 18 will also facilitate handling of the sheet 10 after tracing has been completed, as for filing, for use during presentations, or for permanently mounting the tracing. While the sheet 10 may be of any size, the invention is most useful for sheets whose size is at least about 8 ½"×11", as big as a common sheet of typing paper, and is particularly useful for larger sheets of drafting or tracing paper.

Figure 2:
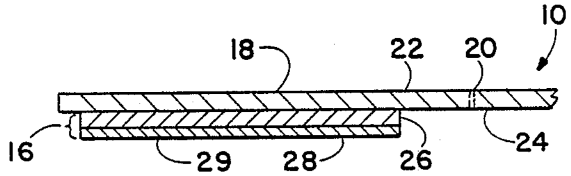
FIG. 2 is a sectional view, taken along line 2—2, of a detail of the sheet of tracing paper shown in FIG. 1.

As may be seen more clearly in FIG. 2, the sheet 10 has an upper face 22 and a lower face 24, and the coating of adhesive 16 is located on the lower face 24 of the marginal portion 18. The adhesive coating 16 may, in fact, consist of two layers, a first layer 26 of an adhesive which adheres quite securely to the lower face 24 of the sheet of paper 10, and a second layer 28 which has a mutual adhesion with the first layer of adhesive material 26 and is also securely cohesive so that it will not leave particles of itself behind if the sheet 10 is removed from adhesion to a surface.

The second layer 28 has an exposed tacky surface 29 which will adhere readily to paper surfaces and the like, as well as to many other types of surfaces, without significant penetration and without such firm adhesion that removal thereafter is prevented or results in damage to the surface of a sheet of paper or the like to which the sheet 10 is attached by means of the reusable adhesive 16. Preferably, the second or outer layer 28 of adhesive material thus permits removal of the sheet 10 from the paper 12 without leaving any of the adhesive material of the outer layer 28 remaining on the paper 12, and without tearing or otherwise damaging the surface to which the sheet 10 has been attached by the use of the adhesive material 16. Such systems of layers of adhesive material are available, for example, in removable note slips manufactured and sold by the Minnesota Mining and Manufacturing Company, of Minneapolis, Minnesota, under the Trademark "Post-It".

Figure 3:
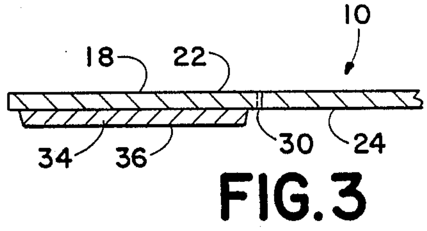
FIG. 3 is a view similar to FIG. 2.
Figure 5:
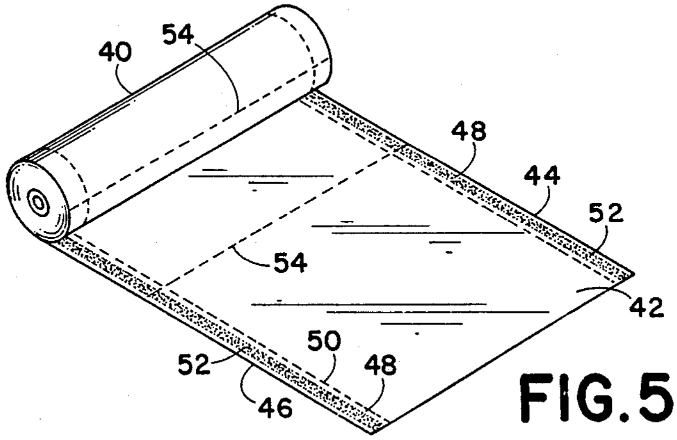
FIG. 5 is a perspective view of a roll of tracing paper according to the present invention.

It should be understood, however, that it is not necessary to utilize an adhesive which is applied in two layers such as the layers 26 and 28, and some types of adhesives may be applied to the marginal portion 18 of the sheet 10 in a thin single coat which is allowed to cure and leave a cohesive layer 34 of the adhesive material securely attached to the marginal portion 18, as shown in FIG. 3. A pressure sensitive tacky surface 36 of the adhesive material is exposed to provide a weaker adhesiveness toward a second surface and thus allow repeatable adhesion and removeability.

The critical characteristic of the adhesive material or system of material 16 used is that it must hold sheet 10 in place to resist slippage and movement relative to a substrate such as the paper 12 on which original material to be traced is located. At the same time, the adhesive 16 must permit removal without causing damage to the surface of the substrate and must leave little or no residue on the surface of the substrate. Another important characteristic of such adhesive material for use in the present invention is that it must not require such a thick coat of material that its presence would interfere appreciably with the use of drafting equipment.

For example, a satisfactory adhesive product manufactured and sold by Borden, Inc., of Columbus, Ohio, under the trademark KRYLON SPRAY ADHESIVE No. 7010 contains heptane, styrene butadiene, propane, butane, and isobutane, and may be sprayed upon a paper surface. The adhesive thus applied cures to remain securely adhered to the surface of the tracing paper in a thin layer presenting a tacky surface with a level of adhesiveness permitting repeated satisfactorily secure adhesion to and safe removal from a paper surface, for example, without significant loss of adhesiveness and leaving little or no residue on the surface to which it has been attached.

Other adhesives, such as rubber cements, for example, also perform satisfactorily. A rubber cement manufactured by Union Rubber and Asbestos Company of Trenton, New Jersey, under the trademark BEST-TEST WHITE RUBBER CEMENT, may be applied to the tracing paper by brushing it onto the paper surface. Thereafter, the adhesive cures, remaining securely attached to the tracing paper and presenting a tacky surface which adheres removably to paper and the like.

The adhesive coating 16 may be applied to a sheet of tracing paper by various methods, depending upon the adhesive material, the dimensions of the tracing paper, and the desired dimensions of the area of application of the adhesive to the paper. For example, adhesives may be applied by brush, by narrow-nozzle spray application, by rollers, or by combinations of such methods of application.

Figure 4:
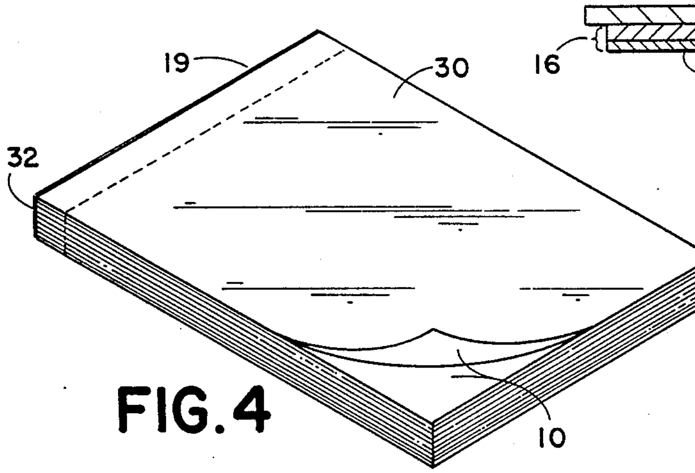
FIG. 4 is a perspective view of a multi-sheet pad of tracing paper according to the present invention.

As shown in FIG. 4, a pad 30 includes a plurality of sheets 10 of tracing paper, aligned with one another and held together by adhesion of the coating of adhesive 16 on the marginal portion 18 of each individual sheet 10 to the adjacent sheet 10. Alternatively, the individual sheets 10 may be more securely held together with one another by a layer 32 of another adhesive applied to the aligned edges 19 of the sheets 10.

For easier handling of larger pieces, drafting paper according to the present invention may also be provided in the form of large rolls such as the roll 40 consisting of an elongate strip 42 of drafting paper having opposite longitudinal edges 44 and 46, which correspond with the opposite ends of the cylindrical roll 40. The roll 40 may be of any useful size, such as being 18" long, for example. A marginal portion 48 is located along one, or optionally along each, of the parallel opposite edges 44 and 46. Each marginal portion 48 is defined, preferably, by a separation line, for example, a respective line of perforations 50. A coating of a reusable, removable adhesive 52 similar to the adhesive 16 is provided in each marginal portion 48, preferably extending substantially continuously along the marginal portion 48. The adhesive 52 can be used to fasten a portion of the elongate strip of drafting paper 42 to the surface of a drawing or the like to facilitate tracing of the drawing to which a portion of the drafting paper 42 is attached.

Optionally, additional lines of perforations 54 may be provided, extending transversely between the opposite edges 44 and 46 at chosen intervals, to facilitate removal of a premeasured portion of the strip of drafting paper 42 from the remainder of the roll 40 without the need for a cutting instrument.

Preferably the drafting paper 42 is sufficiently transparent to permit tracing and sufficiently strong that it will not be torn readily by the process of removal from a surface to which it is attached, by the process of tearing away the marginal portions 48, or by the forces required to tear free a section of the paper along the lines 50 of perforations.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A sheet of drafting paper having a pair of opposite faces and including a marginal portion, one of said faces having a layer of reusable adhesive material located on said marginal portion, and said sheet including parting line means for delineating said marginal portion.

2. The sheet of paper of claim 1 wherein said drafting paper is substantially transparent and said parting line means includes a line of perforations separating said marginal portion from the remainder of said sheet.

3. The sheet of paper of claim 1, including a plurality of oppositely located marginal portions each having a layer of said adhesive on said one of said faces.

4. The sheet of paper of claim 1 wherein said sheet is rectangular and said marginal portion is a narrow portion of said rectangular sheet extending along one edge of said rectangular shape.

5. The sheet of paper of claim 1 wherein said reusable adhesive material is securely adhered to said marginal portion on said face of said sheet, said adhesive material being capable of adhering to other surfaces with which said reusable adhesive material may be brought into contact only with less adhesion than the adhesion to said marginal portion.

6. The sheet of paper of claim 1 wherein said reusable adhesive material has an exposed tacky surface which has an adhesiveness small enough to allow removal of said drafting paper from adhesive attachment to another paper surface substantially without leaving any of said reuseable adhesive on said other paper surface.

7. The sheet of paper of claim 1 wherein said reusable adhesive material has an exposed tacky surface which has an adhesiveness small enough to allow removal of said drafting paper from adhesive attachment to another paper surface substantially without damaging said other paper surface.

8. A pad of tracing paper, comprising:

(a) a plurality of sheets of substantially transparent paper, each having a first edge and a pair of opposite faces;

(b) each sheet having a marginal portion thereof adjacent said first edge, said marginal portion having a coating of a reusable adhesive material securely attached thereto on a first one of said pair of opposite faces;

(c) each sheet including separation means defining a parting line between said marginal portion and the remainder of said sheet, for facilitating separation of said marginal portion from said remainder of said sheet; and (d) means for interconnecting said plurality of sheets to one another along said first edge of each sheet.

9. The pad of tracing paper of claim 8 wherein each said plurality of sheets includes an oppositely located second marginal area having a coating of said reusable adhesive material within such second marginal area on said first face.

10. A pad of tracing paper, comprising:

(a) a plurality of sheets of substantially transparent paper, each having a first edge and a pair of opposite faces;

(b) each sheet having a marginal portion thereof adjacent said first edge, said marginal portion having a coating of a reusable adhesive material securely attached thereto on a first one of said pair of opposite faces;

(c) perforation means included in each of said sheets for defining a parting line between said marginal portion and the remainder of said sheet; and (d) means for interconnecting said plurality of sheets to one another along said first edge of each sheet.

11. An elongate strip of drafting paper having a pair of opposite faces and a pair of substantially parallel opposite longitudinal edges extending longitudinally thereof, said strip of drafting paper being in the form of a roll with said opposite longitudinal edges of said strip defining respective opposite ends of said roll, said strip having a marginal portion extending along and located proximate to one of said longitudinal edges and including a coating of a reusable adhesive material securely attached to said strip within said marginal portion, said strip of paper further including parting line means for delineating said marginal portion and for facilitating removal of said marginal portion from said strip of drafting paper.

12. The strip of paper of claim 11, including parting line means extending transversely of said elongate strip, for delineating premeasured portions of said strip and for facilitating removal of said premeasured portions from said strip.

13. The strip of paper of claim 11, including a respective marginal portion extending along each of said pair of opposite longitudinal edges of said strip of paper.

* * * * *